(12) United States Patent
Tsuji et al.

(10) Patent No.: US 10,413,999 B2
(45) Date of Patent: Sep. 17, 2019

(54) METHODS OF MANUFACTURING AXISYMMETRIC BODY AND AXISYMMETRIC PRODUCT

(71) Applicant: KAWASAKI JUKOGYO KABUSHIKI KAISHA, Kobe-shi, Hyogo (JP)

(72) Inventors: Toshiro Tsuji, Kakogawa (JP); Yoshiro Kabe, Kobe (JP); Yoshihide Imamura, Kobe (JP); Hayato Iwasaki, Kobe (JP); Hiroshi Kitano, Kobe (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 30 days.

(21) Appl. No.: 15/319,831

(22) PCT Filed: Jun. 3, 2015

(86) PCT No.: PCT/JP2015/002813
§ 371 (c)(1),
(2) Date: Dec. 19, 2016

(87) PCT Pub. No.: WO2015/194113
PCT Pub. Date: Dec. 23, 2015

(65) Prior Publication Data
US 2017/0120385 A1    May 4, 2017

(30) Foreign Application Priority Data

Jun. 17, 2014   (JP) .................................. 2014-124105

(51) Int. Cl.
*B23K 26/00*    (2014.01)
*B23K 26/342*   (2014.01)
(Continued)

(52) U.S. Cl.
CPC .......... *B23K 26/342* (2015.10); *B22F 3/1055* (2013.01); *B22F 5/10* (2013.01);
(Continued)

(58) Field of Classification Search
CPC .......... B23K 9/04; B23K 9/042; B23K 9/044; B23K 9/046; B23K 9/048; B23K 26/342; B33Y 10/00; B33Y 30/00; B33Y 70/00
(Continued)

(56) References Cited

U.S. PATENT DOCUMENTS 4,857,693 A    8/1989  Rump
5,038,014 A    8/1991  Pratt et al.
(Continued)

FOREIGN PATENT DOCUMENTS

CN    1618560 A        5/2005
JP    2007-301980 A   11/2007
WO    2013/127655 A1   9/2013

OTHER PUBLICATIONS

Aug. 25, 2015 International Search Report issued in International Patent Application No. PCT/JP2015/002813.
(Continued)

*Primary Examiner* — Alexander M Valvis
(74) *Attorney, Agent, or Firm* — Oliff PLC (57) ABSTRACT

First, an annular first layer including a plurality of beads and having a width that is not less than twice a width of the bead is formed by laser metal deposition on a peripheral surface of a base metal, the peripheral surface facing outward or inward in a radial direction. Next, a plurality of annular height raising layers each including a plurality of beads are stacked on the first layer by the laser metal deposition. According to this configuration, an axisymmetric body
(Continued)

including a flange portion having a relatively wide width can be manufactured while making a heat affected zone in the base metal extremely small.

7 Claims, 9 Drawing Sheets

(51) Int. Cl.
| | | |
|---|---|---|
| *B23K 26/21* | (2014.01) | |
| *B33Y 10/00* | (2015.01) | |
| *B33Y 40/00* | (2015.01) | |
| *B33Y 70/00* | (2015.01) | |
| *B23K 26/70* | (2014.01) | |
| *B23K 26/144* | (2014.01) | |
| *B22F 3/105* | (2006.01) | |
| *B22F 5/10* | (2006.01) | |
| *C22C 1/04* | (2006.01) | |
| *B22F 5/00* | (2006.01) | |
| *B23K 103/14* | (2006.01) | |

(52) U.S. Cl.
CPC ........ *B23K 26/0093* (2013.01); *B23K 26/144* (2015.10); *B23K 26/21* (2015.10); *B23K 26/702* (2015.10); *B23K 26/703* (2015.10); *B33Y 10/00* (2014.12); *B33Y 40/00* (2014.12); *B33Y 70/00* (2014.12); *B22F 2005/005* (2013.01); *B23K 2103/14* (2018.08); *C22C 1/0458* (2013.01); *Y02P 10/295* (2015.11)

(58) Field of Classification Search
USPC ........ 219/76.1, 76.11, 76.12, 121.64; 29/889
See application file for complete search history.

(56) References Cited

U.S. PATENT DOCUMENTS

| | | | |
|---|---|---|---|
| 5,233,150 A | 8/1993 | Schneebeli et al. | |
| 6,548,125 B2 * | 4/2003 | Warnecke | C23C 24/10 |
| | | | 148/512 |
| 8,613,139 B2 * | 12/2013 | Flesch | B23K 9/048 |
| | | | 219/130.5 |
| 2002/0076573 A1 * | 6/2002 | Neal | B23P 6/007 |
| | | | 428/621 |
| 2006/0054079 A1 * | 3/2006 | Withey | C30B 13/24 |
| | | | 117/108 |
| 2006/0090336 A1 * | 5/2006 | Graham | B23P 6/007 |
| | | | 29/889.1 |
| 2007/0253810 A1 | 11/2007 | Mons et al. | |
| 2010/0266438 A1 | 10/2010 | Gensert | |
| 2015/0190962 A1 * | 7/2015 | Yang | B33Y 10/00 |
| | | | 428/209 |
| 2015/0367416 A1 * | 12/2015 | Buller | B23K 26/346 |
| | | | 419/53 |

OTHER PUBLICATIONS

Aug. 25, 2015 Written Opinion issued in International Patent Application No. PCT/JP2015/002813.
Nov. 21, 2017 Office Action issued in Canadian Patent Application No. 2,951,615.
Dec. 25, 2017 Office Action issued in Chinese Patent Application No. 201580032020.X.
Jan. 31, 2018 Extended Search Report issued in European Patent Application No. 15810540.3.

* cited by examiner

METHODS OF MANUFACTURING AXISYMMETRIC BODY AND AXISYMMETRIC PRODUCT

TECHNICAL FIELD

The present invention relates to a method of manufacturing an axisymmetric body including a flange portion and a method of manufacturing an axisymmetric product from the axisymmetric body obtained by the above manufacturing method.

BACKGROUND ART

An axisymmetric body including a flange portion is manufactured by, for example, casting or cutting of a columnar or thick cylindrical raw material. However, the casting requires high cost for manufacturing a mold, and the cutting wastes a large amount of materials.

SUMMARY OF INVENTION

Technical Problem

Therefore, it is desired that a flange portion be formed later at a base metal. For example, it can be thought that a ring-shaped plate is joined to a tubular base metal by full penetration welding. However, since the amount of heat input to the base metal in the welding is extremely large, a heat affected zone (HAZ) in the base metal becomes large.

Here, the heat affected zone in the base metal can be made extremely small by using laser metal deposition (LMD) disclosed in PTL 1, for example. The technology disclosed in PTL 1 presupposes that: the base metal has a flat plate shape; and a projection having a relatively narrow width that is not more than twice a bead generated by the laser metal deposition is formed. Thus, the technology disclosed in PTL 1 is not intended to form an annular flange portion used as a structural member. Further, a flange portion having a relatively wide width cannot be formed by the technology disclosed in PTL 1.

An object of the present invention is to provide a method of manufacturing an axisymmetric body including a flange portion having a relatively wide width by using laser metal deposition and a method of manufacturing an axisymmetric product from the axisymmetric body.

Solution to Problem

To achieve the above object, a method of manufacturing an axisymmetric body according to the present invention is a method of manufacturing an axisymmetric body including a flange portion, the method including the steps of: forming an annular first layer on a peripheral surface of a base metal by laser metal deposition, the first layer being including a plurality of beads and having a width that is not less than twice a width of the bead, the peripheral surface facing outward or inward in a radial direction; and stacking a plurality of annular height raising layers on the first layer by the laser metal deposition, the height raising layers each being including a plurality of beads.

According to the above configuration, the axisymmetric body including the flange portion having a relatively wide width can be manufactured while making a heat affected zone in the base metal extremely small.

The first layer may be formed in such a manner that the beads extending in a circumferential direction of the base metal are lined up in an axial direction of the base metal, and each of the plurality of height raising layers may be formed in such a manner that the beads extending in the circumferential direction of the base metal are lined up in the axial direction of the base metal. Each of the first layer and the height raising layers can also be formed in such a manner that short beads extending in the axial direction of the base metal are lined up in the circumferential direction of the base metal by moving a nozzle, which emits a laser beam, zigzag relative to the peripheral surface of the base metal. However, in this case, a time from when one bead is formed until when a new bead is adjacently formed is extremely short. Therefore, the amount of heat accumulated in the base metal may become large, and the distortion of the base metal may become large. Further, the amount of heat accumulated in the base metal that is a base of the axisymmetric body and is continuous in the circumferential direction becomes large, and the distortion of the base metal becomes significant. In contrast, in a case where the beads extending in the circumferential direction of the base metal are lined up in the axial direction of the base metal as in the above configuration, a time from when one bead is formed until when a new bead is adjacently formed becomes extremely long. Therefore, the amount of heat accumulated in the base metal is decreased, and the distortion of the base metal can be made small.

The first layer may be formed while cooling the base metal, and each of the plurality of height raising layers may be formed while cooling the base metal. According to this configuration, oxidation of elements in a fusion zone of the base metal and the supply metal (wire or metal powder) can be suppressed. Especially, when the base metal is made of a titanium alloy, and the fusion zone is high in temperature, the fusion zone tends to have porosity because of oxidization of the titanium. Therefore, this configuration is useful especially when the base metal is made of the titanium alloy.

Each of the plurality of height raising layers may be formed under a condition different from a condition under which the first layer is formed. States (depressions and projections, temperature, etc.) of an immediately-before formed layer (the first layer or the height raising layer formed previously) that is a layer formed immediately before one height raising layer are different from states of the peripheral surface of the base metal on which the first layer is formed. Therefore, when the condition under which the first layer is formed and the condition under which each of the height raising layers is formed are made different from each other, quality of all the first layers and the height raising layers can be made uniform.

For example, the base metal may be made of a titanium alloy.

Metal powder may be used in the laser metal deposition. In the LMD, a wire can also be used as the supply metal. However, by using the metal powder as in this configuration, advantages are that, for example, a generation speed of the beads and the shape of the bead can be controlled easily.

The base metal may include a tapered body portion and an annular wall projecting inward from a large-diameter end of the body portion, and the first layer may be formed at an intermediate position of the body portion and on an inner peripheral surface of the base metal. According to this configuration, a shape that is difficult to manufacture by casting using a mold can be realized.

Further, a method of manufacturing an axisymmetric product from the axisymmetric body obtained by the above method according to the present invention includes the step of cutting the axisymmetric body by machine work. According to this configuration, a highly accurate axisymmetric product can be manufactured at low cost.

Advantageous Effects of Invention

The present invention can manufacture the axisymmetric body including the flange portion having a relatively wide width by using the laser metal deposition.

CITATION LIST

Patent Literature

PTL 1: Japanese Laid-Open Patent Application Publication No. 2007-301980

DESCRIPTION OF EMBODIMENTS

Figure 1:
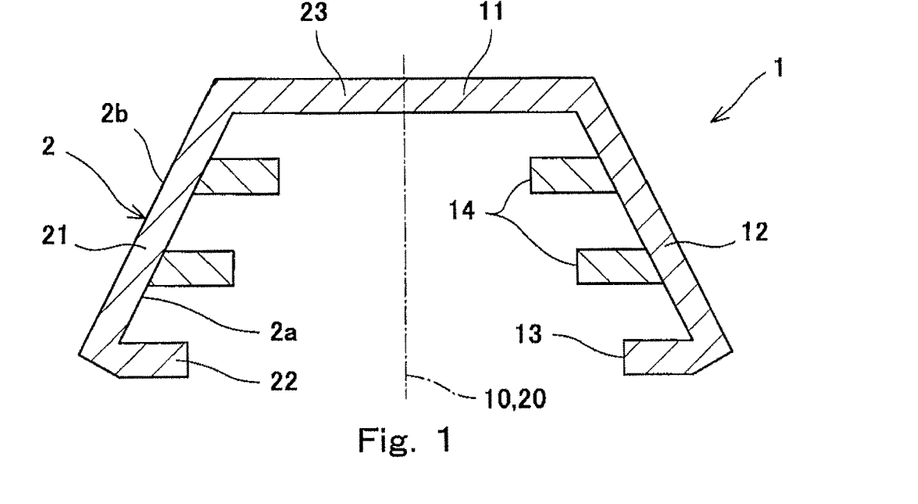
FIG. 1 is a cross-sectional view of an axisymmetric body obtained by a method of manufacturing the axisymmetric body according to one embodiment of the present invention.

A method of manufacturing an axisymmetric body according to one embodiment of the present invention is a method of manufacturing an axisymmetric body 1 having a shape that is symmetrical around a central axis 10 as shown in FIG. 1. In the present embodiment, the axisymmetric body 1 is hollow and opens in an axial direction (downward direction in FIG. 1). Specifically, the axisymmetric body 1 includes: a ceiling wall 11; a tapered peripheral wall 12 spreading from a peripheral portion of the ceiling wall 11; two first flange portions 14 (each corresponding to a flange portion of the present invention) projecting inward in a radial direction from an intermediate portion of the peripheral wall 12; and a second flange portion 13 projecting inward in the radial direction from a tip end of the peripheral wall 12.

However, the shape of the axisymmetric body 1 is not limited to the shape shown in FIG. 1. For example, the peripheral wall 12 of the axisymmetric body 1 may be straight. Further, the number of first flange portions 14 may be one or may be three or more. Furthermore, the first flange portions 14 may project outward in the radial direction. A projecting direction of the first flange portions 14 does not necessarily have to be parallel to the radial direction of a base metal 2 and may be inclined relative to the radial direction of the base metal 2. Further, instead of the second flange portion 13, the first flange portion 14 may project inward or outward in the radial direction from the tip end of the peripheral wall 12. Furthermore, the axisymmetric body 1 does not necessarily have to be hollow and may be solid.

Figure 2:
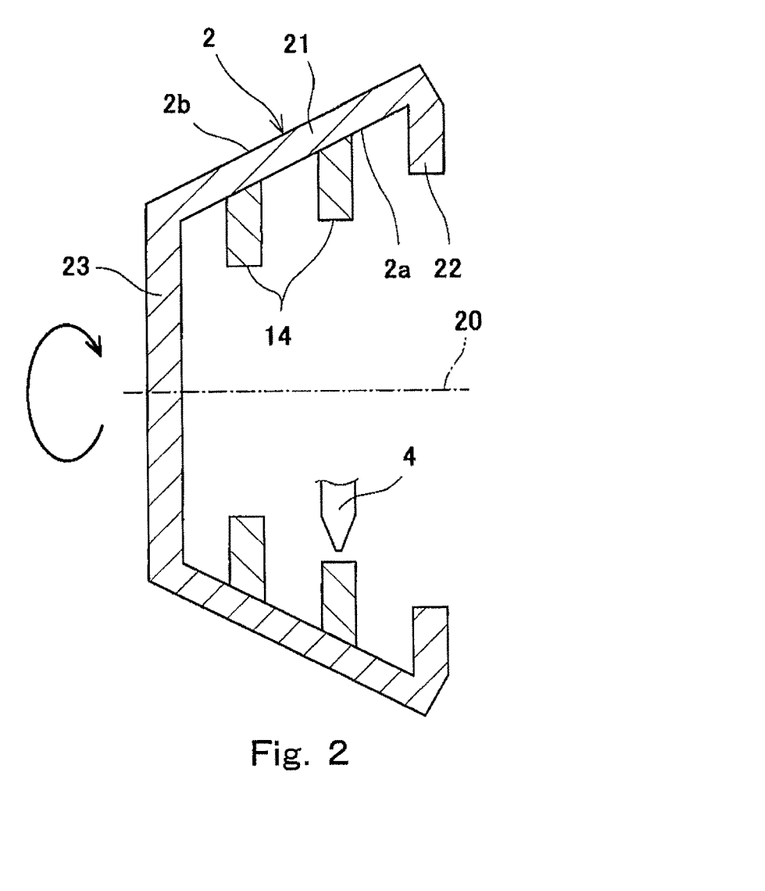
FIG. 2 is an explanatory diagram of the method of manufacturing the axisymmetric body.
Figure 6:
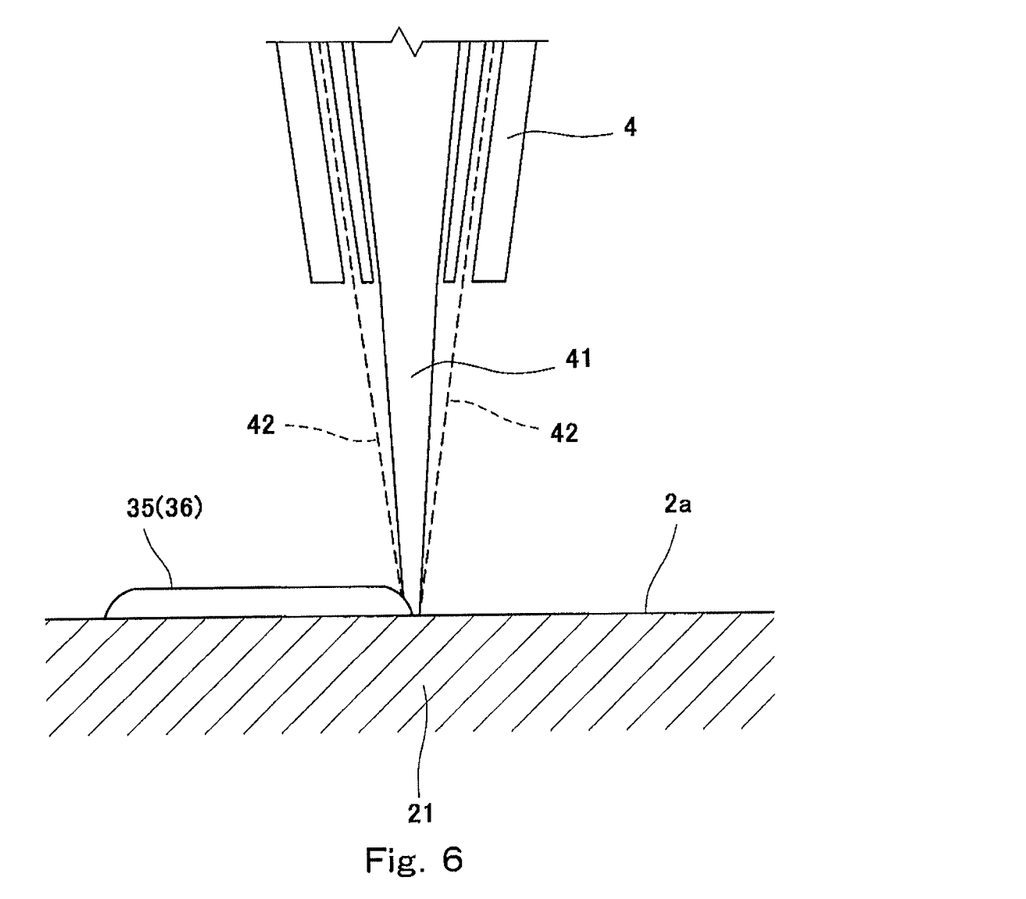
FIG. 6 is an enlarged cross-sectional view of a nozzle of a LMD device.

According to the manufacturing method of the present embodiment, the first flange portions 14 are formed later at the base metal 2 by the LMD. In the present embodiment, metal powder is used as supply metal for the LMD. However, a wire may be used instead of the metal powder. Specifically, as shown in FIGS. 2 and 6, while rotating the base metal 2 around its central axis 20, a laser beam 41 is emitted and metal powder 42 is injected from a nozzle 4 of a LMD device toward an inner peripheral surface 2a (peripheral surface facing inward in the radial direction) of the base metal 2. It should be noted that in the above-described case where the first flange portion 14 is formed so as to project outward in the radial direction, the laser beam 41 may be emitted and the metal powder 42 may be injected from the nozzle 4 toward an outer peripheral surface 2b (peripheral surface facing outward in the radial direction) of the base metal 2.

The base metal 2 has a shape obtained by removing the first flange portions 14 from the axisymmetric body 1. More specifically, the base metal 2 includes: a disk-shaped wall 23 that defines the ceiling wall 11 of the axisymmetric body 1; a tapered body portion 21 that defines the peripheral wall 12 of the axisymmetric body 1; and an annular wall 22 that defines the second flange portion 13 of the axisymmetric body 1 and projects inward from a large-diameter end of the body portion 21. The base metal 2 can be produced in such a manner that, for example, a disk-shaped plate is formed in a tapered shape by spinning forming, and a tip end portion of the tapered shape is then pushed inward in the radial direction.

A material constituting the base metal 2 is not especially limited but is, for example, a titanium alloy. The metal powder may have the same composition as the base metal or may have a different composition from the base metal. For example, when the base metal 2 is made of the titanium alloy, the metal powder may be a titanium alloy different from the base metal 2 or may be an alloy other than the titanium alloy.

Figure 3A:
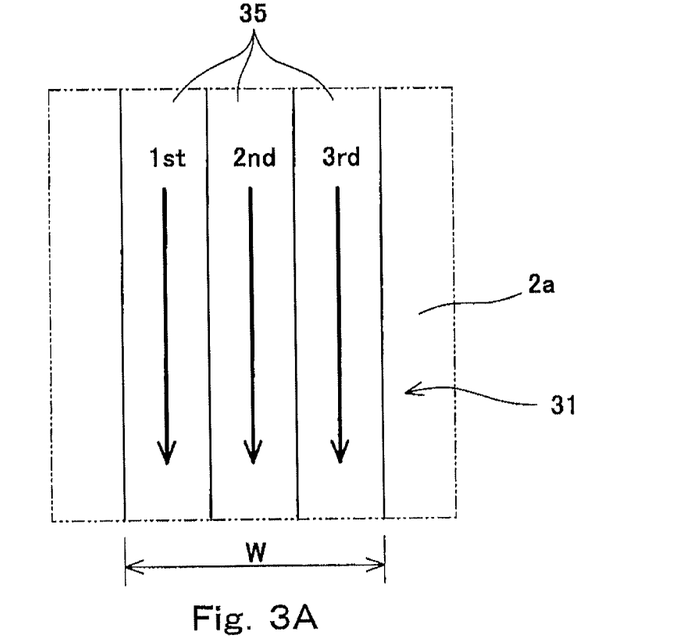
FIG. 3A is a diagram when a base metal is viewed from an inner side in a case where a first layer is formed in such a manner that beads extending in a circumferential direction of the base metal are lined up.
Figure 3B:
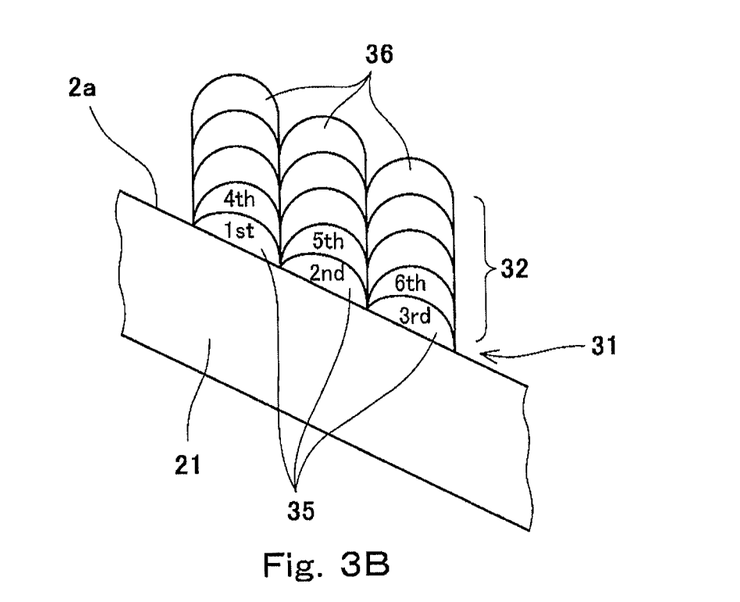
FIG. 3B is a cross-sectional view showing the first layer and height raising layers.

As shown in FIGS. 3A and 3B, according to the manufacturing method of the present embodiment, first, an annular first layer 31 that is continuous in a circumferential direction of the base metal 2 is formed by the LMD at the intermediate position of the body portion 21 and on the inner peripheral surface 2a of the base metal 2. Next, a plurality of annular height raising layers 32 that are continuous in the circumferential direction of the base metal 2 are stacked on the first layer 31 by the LMD.

Figure 4:
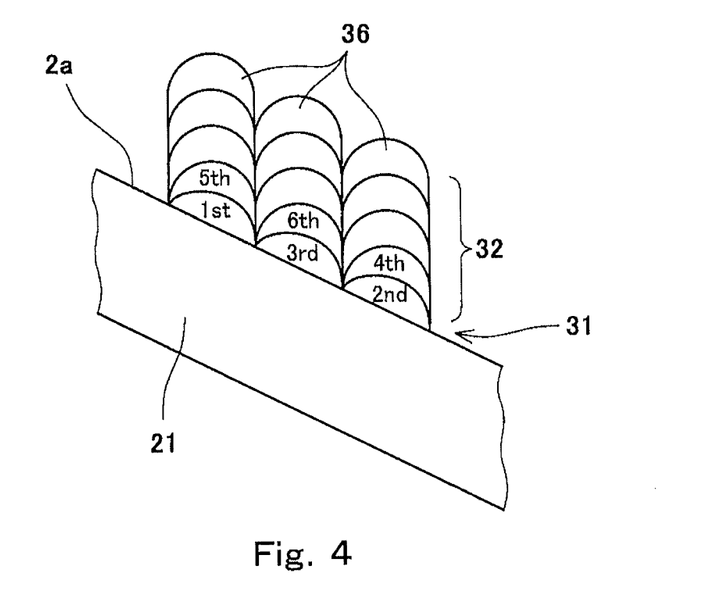
FIG. 4 is a cross-sectional view showing the first layer and the height raising layers and shows Modified Example of an order of generation of beads when forming the first layer and the height raising layers.

The first layer 31 includes a plurality of beads 35 and has a width W (axial width of the base metal 2) that is not less than twice the width of the bead 35. In the present embodiment, the first layer 31 is formed in such a manner that the beads 35 extending in the circumferential direction of the base metal 2 are lined up in the axial direction of the base metal 2. For example, the beads 35 may be formed in a path order shown in FIGS. 3A and 3B (i.e., the beads 35 may be formed from a small-diameter side of the body portion 21 toward a large-diameter side thereof). Or, to obtain a stable shape, an irregular path order shown in FIG. 4 may be determined based on experience or the like.

Referring back to FIGS. 3A and 3B, each of the height raising layers 32 also includes a plurality of beads 36. In the present embodiment, each of the height raising layers 32 is formed in such a manner that the beads 36 extending in the circumferential direction of the base metal 2 are lined up in the axial direction of the base metal 2. For example, the beads 36 may be formed in a path order shown in FIGS. 3A and 3B (i.e., the beads 36 may be formed from the small-diameter side of the body portion 21 toward the large-diameter side thereof). Or, to obtain a stable shape, an irregular path order shown in FIG. 4 may be determined based on experience or the like.

Figure 5A:
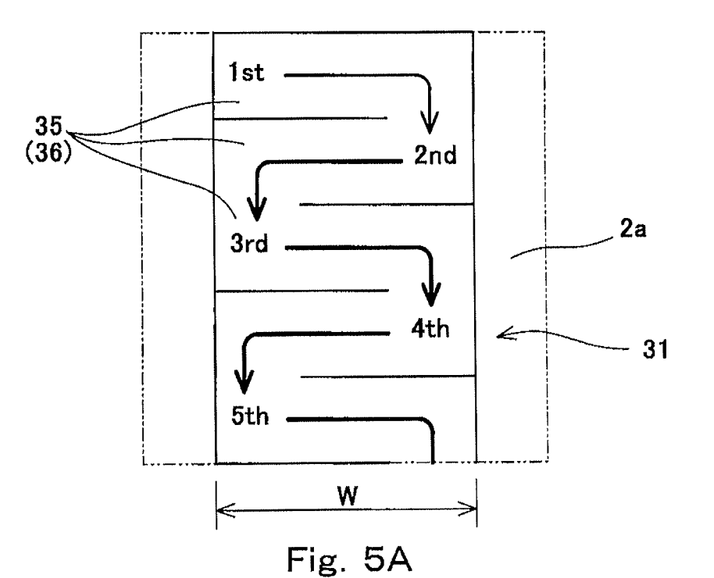
FIG. 5A is a diagram when the base metal is viewed from the inner side in a case where the first layer is formed in such a manner that the beads extending in an axial direction of the base metal are lined up.
Figure 5B:
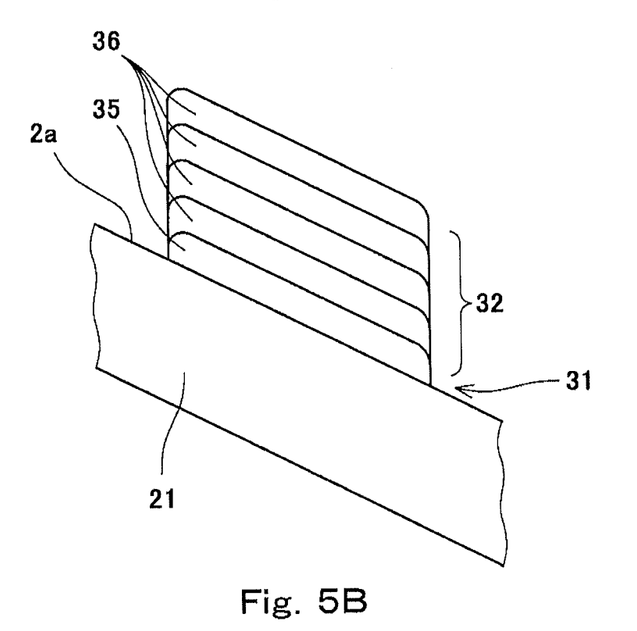
FIG. 5B is a cross-sectional view showing the first layer and the height raising layers.

However, as shown in FIGS. 5A and 5B, the first layer 31 may be formed in such a manner that the beads 35 extending in the axial direction of the base metal 2 are lined up in the circumferential direction of the base metal 2 by moving the nozzle 4 zigzag relative to the inner peripheral surface 2a of the base metal 2. Similarly, each of the height raising layers 32 may be formed in such a manner that the beads 36 extending in the axial direction of the base metal 2 are lined up in the circumferential direction of the base metal 2.

Figure 7:
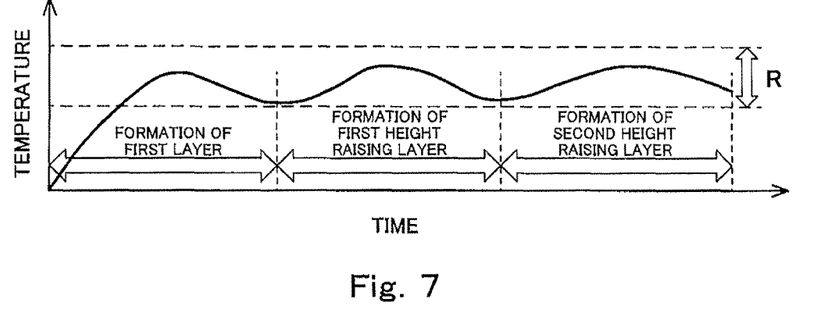
FIG. 7 is a graph showing a temporal change of a temperature of a specific position of the base metal.

It is desirable that the first layer 31 and each of the height raising layers 32 be formed while cooling the base metal 2. This is to maintain the temperature of the base metal 2 within a certain range R as shown in FIG. 7. As a device that cools the base metal 2, a fan 6 may be used as shown in FIG. 9, or a jacket 7 attached to the base metal 2 may be used as shown in FIG. 10.

Figure 9:
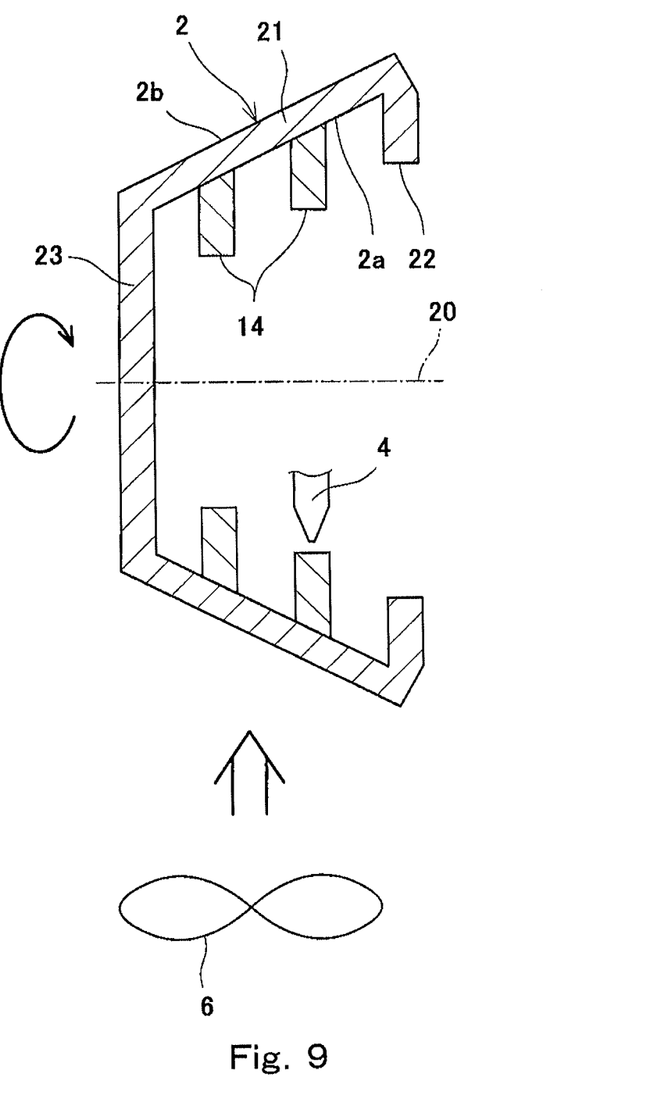
FIG. 9 is an explanatory diagram showing the method of manufacturing the axisymmetric body when a fan is used as a device that cools the base metal.
Figure 10:
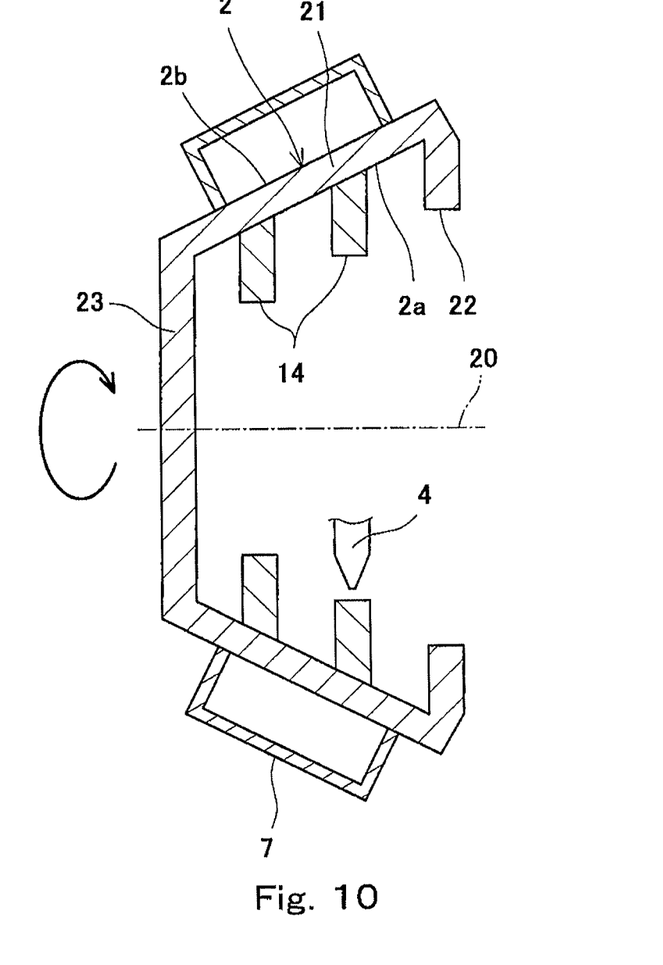
FIG. 10 is an explanatory diagram showing the method of manufacturing the axisymmetric body when a jacket is used as the device that cools the base metal.

For example, when the fan 6 is used as shown in FIG. 9, the temperature of an arbitrary position of the base metal 2 may be monitored, and an air flow rate of the fan 6 may be controlled such that the monitored temperature is maintained within the certain range R. Or, when the jacket 7 is used as shown in FIG. 10, the temperature of the arbitrary position of the base metal 2 may be monitored, and the flow rate of a cooling liquid flowing through the jacket 7 may be controlled such that the monitored temperature is maintained within the certain range R.

By forming the first layer 31 and each of the height raising layers 32 while cooling the base metal 2, oxidation of elements in a fusion zone of the base metal 2 and the metal powder can be suppressed. Especially, when the base metal 2 is made of a titanium alloy, and the fusion zone is high in temperature, the fusion zone tends to have porosity because of oxidization of the titanium. Therefore, the cooling of the base metal 2 is useful especially when the base metal 2 is made of the titanium alloy.

It is desirable that each of the height raising layers 32 be formed under a condition different from a condition under which the first layer 31 is formed. States (depressions and projections, temperature, etc.) of an immediately-before formed layer (the first layer 31 or the height raising layer 32 formed previously) that is a layer formed immediately before one height raising layer 32 are different from states of the inner peripheral surface 2a of the base metal 2 on which the first layer 31 is formed. Therefore, when the condition under which the first layer 31 is formed and the condition under which each of the height raising layers 32 is formed are made different from each other, quality of all the first layers 31 and the height raising layers 32 can be made uniform.

For example, when depressions and projections on the first layer 31 are large, and each of the height raising layers 32 is formed, heat energy input to the immediately-before formed layer is increased (for example, the output of the laser beam is increased), and this increases the amount of penetration. Or, for example, when the amount of heat accumulated in the base metal 2 is large, and each of the height raising layers 32 is formed, the heat energy input to the immediately-before formed layer is decreased (for example, the output of the laser beam is decreased), and this decreases the amount of penetration.

When stacking the height raising layers 32, it is desirable that: the shape of the first flange portion 14 in the middle of the forming be monitored by a camera or the like; and when the shape of the first flange portion 14 is different from an ideal shape, the position of the nozzle 4 be corrected.

The above-explained manufacturing method of the present embodiment can manufacture the axisymmetric body 1 including the first flange portion 14 having a relatively wide width while making the heat affected zone in the base metal 2 extremely small.

As explained above in reference to FIGS. 5A and 5B, each of the first layer 31 and the height raising layers 32 can also be formed in such a manner that short beads (35 or 36) extending in the axial direction of the base metal 2 are lined up in the circumferential direction of the base metal 2. However, in this case, a time from when one bead is formed until when a new bead is adjacently formed is extremely short. Therefore, the amount of heat accumulated in the base metal 2 may become large, and the distortion of the base metal 2 may become large. Further, the amount of heat accumulated in the base metal 2 that is a base of the axisymmetric body 1 and is continuous in the circumferential direction becomes large, and the distortion of the base metal 2 becomes significant. In contrast, in a case where the beads extending in the circumferential direction of the base metal 2 are lined up in the axial direction of the base metal 2 as in the present embodiment, a time from when one bead is formed until when a new bead is adjacently formed becomes extremely long. Therefore, the amount of heat accumulated in the base metal 2 is decreased, and the distortion of the base metal 2 can be made small.

Further, in the present embodiment, the metal powder is used as the supply metal for the LMD. Therefore, advantages are that, for example, a generation speed of the beads 35 and 36 and the shape of the bead can be controlled more easily than when the wire is used.

By using the base metal 2 including a radially retreating portion covered with the body portion 21 and the annular wall 22 at both axial sides, a shape which is difficult to manufacture by casting using a mold can be realized.

Figure 8:
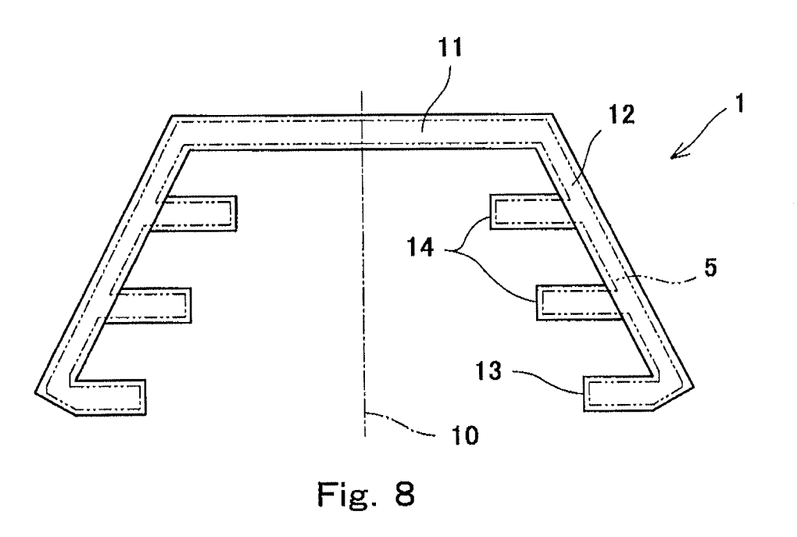
FIG. 8 is a cross-sectional view showing a relation between the axisymmetric body and an axisymmetric product.

The axisymmetric body 1 obtained by the manufacturing method of the present embodiment may be used as a product. However, as shown in FIG. 8, a highly accurate axisymmetric product 5 can be manufactured at low cost by cutting the axisymmetric body 1 by machine work.

The present invention is not limited to the above embodiment, and various modifications may be made within the scope of the present invention.

INDUSTRIAL APPLICABILITY

The present invention is widely applicable to the manufacture of the axisymmetric body used in various applications.

REFERENCE SIGNS LIST 1 axisymmetric body
14 first flange portion
2 base metal
2a inner peripheral surface
2b outer peripheral surface
21 body portion
22 annular wall
31 first layer
32 height raising layer
35, 36 bead
42 metal powder
5 axisymmetric product

The invention claimed is:

1. A method of manufacturing an axisymmetric body including a flange portion, the method comprising the steps of:
forming an annular first layer on an inner peripheral surface of a base metal, which includes a tapered body portion and an annular wall projecting inward from a large-diameter end of the body portion, at an intermediate position of the tapered body portion by laser metal deposition, the first layer including a plurality of beads and having a width that is not less than twice a width of one of the plurality of beads; and
stacking a plurality of annular height raising layers on the first layer by the laser metal deposition, the height raising layers each including a plurality of beads, to form the flange portion.

2. The method according to claim 1, wherein:
the first layer is formed in such a manner that the beads extending in a circumferential direction of the base metal are lined up in an axial direction of the base metal; and
each of the plurality of height raising layers is formed in such a manner that the beads extending in the circumferential direction of the base metal are lined up in the axial direction of the base metal.

3. The method according to claim 1, wherein:
the first layer is formed while cooling the base metal; and
each of the plurality of height raising layers is formed while cooling the base metal.

4. The method according to claim 1, wherein each of the plurality of height raising layers is formed under a condition different from a condition under which the first layer is formed.

5. The method according to claim 1, wherein the base metal is made of a titanium alloy.

6. The method according to claim 1, wherein metal powder is used in the laser metal deposition.

7. A method of manufacturing an axisymmetric product from the axisymmetric body obtained by the method according to claim 1,
the method comprising the step of cutting the axisymmetric body by machine work.

* * * * *